(12) United States Patent
Fox

(10) Patent No.: US 7,669,054 B2
(45) Date of Patent: Feb. 23, 2010

(54) LEGACY ACCESS CONTROL SECURITY SYSTEM MODERNIZATION APPARATUS

(75) Inventor: Christopher Wayne Fox, San Antonio, TX (US)

(73) Assignee: Common Credential Systems, L.L.C., Houston, TX (US)

( * ) Notice: Subject to any disclaimer, the term of this patent is extended or adjusted under 35 U.S.C. 154(b) by 1116 days.

(21) Appl. No.: 11/206,275

(22) Filed: Aug. 17, 2005

(65) Prior Publication Data

US 2007/0043954 A1     Feb. 22, 2007

(51) Int. Cl.
*G06F 9/00* (2006.01)

(52) U.S. Cl. ............... 713/172; 713/171; 713/175; 713/185

(58) Field of Classification Search .......... 713/172, 713/171, 175, 185
See application file for complete search history.

(56) References Cited

U.S. PATENT DOCUMENTS

| | | | | |
|---|---|---|---|---|
| 4,516,125 | A | * | 5/1985 | Schwab et al. ............... 342/36 |
| 4,845,629 | A | * | 7/1989 | Murga ...................... 701/120 |
| 4,910,692 | A | * | 3/1990 | Outram et al. .............. 702/187 |
| 5,109,278 | A | * | 4/1992 | Erickson et al. ............ 348/153 |
| 5,679,945 | A | | 10/1997 | Renner et al. |
| 2005/0127172 | A1 | | 6/2005 | Merket, Sr. |

OTHER PUBLICATIONS

Security Industry Association, Access Control Standard Protocol for the 26-BIT Wiegand Reader Interface, Oct. 17, 1996, at pp. 4-9.
Security Equipment Integration Working Group, Access Control Technologies for the Common Access Card, Apr. 2002, at pp. 3-7.
Physical Access Interagency Interoperability Working Group, Technical Implementation Guidance: Smart Card Enabled Physical Access Control Systems v. 2.2, Jul. 30, 2004, at 4-5.
Maxim/Dallas Semiconductor, Securing Electronic Transactions Using SHA-1 Secure Hash Algorithm, Oct. 21, 2002, at 1-4.
Maxim/Dallas Semiconductor, White Paper 8: 1-Wire SHA-1 Overview, Sep. 10, 2002, at 1-12.

* cited by examiner

*Primary Examiner*—Thomas Peeso
(74) *Attorney, Agent, or Firm*—Erie W. Cernyar

(57) ABSTRACT

A system is provided for upgrading a legacy security system having a legacy control panel and a legacy card reader, without interfering with legacy system operation. A new control panel is installed between the legacy card reader and the legacy control panel. Also, a new token reader is installed next to the legacy card reader and connected to the new control panel. The new control panel passes credentials it receives from the legacy card reader to the legacy control panel, avoiding interference with legacy system operation. When the new control panel receives credentials from the new token reader, it evaluates them against an access rights list administered independently of the legacy access rights list. When the new control panel determines that an access request should be granted, it sends a memorized legacy credential associated with full access rights to the legacy control panel, causing it to open the door.

20 Claims, 16 Drawing Sheets

| Secondary Token Credential | Situation Modes Door 1 | | | Situation Modes Door 2 | | |
|---|---|---|---|---|---|---|
| | Normal | Lockdown | Disaster Response | Normal | Lockdown | Disaster Response |
| DCD882D77D906624 | Y | N | Y | Y | Y | Y |
| 39A04B514F2123E8 | N | N | Y | Y | N | Y |
| 63F8AE7710D476F2 | N | N | Y | N | N | Y |
| 0FF47C2BB02A35E9 | N | N | Y | N | N | Y |
| 7A59BA301F644CE1 | Y | N | Y | Y | N | Y |
| 835B590C32A590B7 | N | N | Y | N | N | N |
| 601CF2AA89178D11 | N | N | Y | Y | N | Y |
| FFA284E67B41DE93 | N | N | Y | Y | N | Y |

LEGACY ACCESS CONTROL SECURITY SYSTEM MODERNIZATION APPARATUS

FIELD OF THE INVENTION

This invention relates to electronic access control systems, and in particular, to systems designed to retrofit, function with, and improve the operability, of existing, already-installed (legacy) electronic physical door lock control systems.

BACKGROUND OF THE INVENTION

As used in this application, the phrase "legacy security system" is used to describe an already-installed electronic security system that controls access to physical devices, areas, or computer systems. The word "token" is used to describe a device, such as an identification badge, a smart card, a magnetic stripe card, a bar-coded badge, a radio frequency identification (RFID) tag, or an identification chip carried by a person and used to identify that person to an electronic system for the purpose of gaining access to physical devices, areas, computer files, or computer systems. A "key" or "credential" is data held in the token that is transferred or presented to establish a claimed identity and/or the authorizations of a system entity. A "portal" is an entrance, entrance point, or means of entrance, such as a physical doorway, gate, or a computer interface for gaining access to a program, database, or computer system. A "control panel" is a device that controls access to a portal and is operable to receive information from electronic keys or credentials from a remotely-located token reader and, by reference to an access rights list, database, and/or schedule, determine whether access should be granted or denied to the token holder. The phrase "control panel" is not limited to control apparatuses housed in what might conventionally be regarded as a "panel," but also encompasses integral control units and apparatuses situated on a board, a rack, or inside a box or other enclosure.

A typical access control system in use today has two main parts: (1) an access rights administration and badging station and an (2) authorization and privilege control system. The access rights administration system and badging station is used to issue new tokens to users and assign, modify, or remove access rights. Typically, the authorization and privilege control system comprises one or more control panels (sometimes called "field panels") installed in secure areas (such as control panel closets) that may be remote from the door/portal areas. Each control panel is connected via sets of wires to between one and four (sometimes more) token readers.

There are a wide variety of legacy security systems in use today. Different legacy systems use a wide range of different, non-interoperable brands and styles of electronic tokens. The tokens used in many legacy systems today are simple magnetic stripe or bar code cards, or radio frequency proximity devices, that have limited credential serialization capability (often dedicating no more than 16 bits, or 65,536 possible unique numbers, to the credential) and lack effective security against duplication or tampering.

Furthermore, many legacy systems are administered over non-public communications lines or networks using customized software. The communications systems and databases used to collect audit data and manage access rights often provide no network capability or are too insecure for use on a public network.

Many companies have different and incompatible legacy security systems in operation at different buildings. Consequently, these companies sometimes issue certain employees multiple badges so that they can access multiple systems. Efforts to make different legacy security systems work together may be hampered by the limited number of tokens or credentials that the legacy systems can support, the limited number of tokens that can be retained in the local memory of the door control hardware, the lack of standardization of keys and network communications, and the limited capabilities of legacy system servers to support a wide token management scope.

In summary, there are very few common, industry-wide specifications for the hardware design, authentication routines, credential format, hardware communication, and access rights administration of access control systems. But there is one prominent exception. Most access control and security systems in use today use an industry standard communications protocol called "Wiegand" to interface card (and other token) readers with their control panels. In October 1996, the Security Industry Association (SIA) promulgated the "Access Control Standard Protocol for the 26-bit Wiegand Reader Interface," which is herein incorporated by reference. This standard provides electrical specifications necessary for communications between Wiegand card readers and security, access control, and other related control panels. Any card reader built in accordance with this standard should be able to operate with any control panel built in accordance with this standard.

The Wiegand protocol provides two data channels, called Data Zero and Data One, that share a common ground, for sending binary serial data streams. Each pulse on the Data Zero wire represents a zero bit. Each pulse on the Data One wire represents a one bit. The SIA's Wiegand protocol provides that the Data One and Data Zero signals should normally be held at a logic high level unless the reader is ready to send a data stream. The reader places asynchronous low going pulses (pulses that change from a higher voltage level to a lower voltage level) on the appropriate data lines to transmit a serial data stream to the panel. The SIA's Wiegand protocol provides that each low going pulse should have a width of between 20-100 microseconds. The interval between any two pulses should range between 200 microseconds and 20 milliseconds.

The SIA's Wiegand protocol also provides minimal specifications for the data format of the serial data stream that is communicated from a card reader to the control panel. Of a 26-bit Wiegand data stream, the first bit is an even parity bit calculated over the succeeding 12 code bits, the next 24 bits are code bits, and the last bit is an odd parity bit calculated over the preceding 12 code bits. The SIA standard provides that the data format within the 24 code bits, including the partitioning of the bit and the designation of the most and least significance bits, is subject to definition by the panel and reader manufacturers and may remain proprietary. With most card readers, the first 8 code bits represent a facility or site code and the other 16 code bits represent the card key.

The limitations inherent in the vast patchwork of legacy access control systems in use throughout the United States today are keenly felt by the nation's emergency planning coordinators. The events of Sep. 11, 2001, revealed a need to provide emergency personnel in the region, especially firefighters and medical practitioners from surrounding areas, with prompt and unchaperoned access to hospital emergency rooms near the impact zone. Such personnel would not normally need to have unchaperoned access to these areas. Today, it would generally be unfeasible, for a centrally located hospital equipped with a typical low-capacity legacy system, to issue thousands of legacy tokens to the emergency response personnel of the surrounding region.

In recent years, the Department of Defense and other government agencies have developed common specifications and a technology migration plan for upgrading existing access control systems with the goal of making tokens used for Agency A's security system interoperable with Agency B's security system.

Many institutions, companies and agencies, however, have already invested significantly in their existing legacy security systems. Replacing these legacy security systems with completely new security systems is expensive and disruptive. Replacement costs include installing new wires between the new token readers and the new control panels and installing expensive new electronic locks, door strikes, and other barrier mechanism activation devices. Furthermore, new tokens must be issued to all existing employees, and access rights and schedules assigned to all the new tokens.

One conceivable alternative to complete replacement (and not necessarily disclosed in the prior art) would be to install a parallel access control system that shares direct electrical control of the physical door locks and door status switches. In other words, the parallel access control system and the legacy control system would share access to the magnetic lock mechanism, the "door ajar" switch, and the "request to exit" pushbutton or switch. This alternative, however, would have several disadvantages. First, all of the door wiring (as many as 16 conductors) between the control panels and the door would have to be duplicated. Second, sharing the door switches and electronic lock operation would essentially constitute a "science project" at each new door, consuming many costly man-hours. Because there are no universal standards for how these switches are wired or for the communications protocols used to operate and communicate with them, the circuitry required to share such access would likely vary from one legacy system to the next. Boxes with special custom "helper" circuitry and expensive power supplies and relays would have to be built for the parallel systems. Third, the parallel installation would likely void many existing legacy system service contracts and warranties.

Thus, there is a need to provide an auxiliary access rights administration system with greatly expanded key capabilities, greater key/token security, and secure network administration capabilities. There is also a need to avoid the disruption typically associated with replacing the legacy security system. Finally, it is also desirable to make use of as much of the hardware of the legacy security system. Prior art efforts to meet these needs have fallen short.

U.S. Pat. No. 5,679,945 to Renner et al., entitled "Intelligent Card Reader Having Emulation Features," describes a smart card reader that can replace a legacy magnetic-stripe card reader, and yet remain compatible with the legacy controller by emulating the communication manner of the legacy card reader. Renner teaches that "a [legacy] Wiegand effect card coded in a particular manner can be replaced with a smart card onto which the same code is stored." Col. 6, lines 1-3. "The intelligent card reader reads the preprogrammed code from the smart card, converts the code into Wiegand effect signals, and transmits the Wiegand effect signals over wires to an external device which normally expects to receive such signals." Col. 6, lines 5-10.

Renner's system, however, does not increase the number of keys that the combined security system can handle. If the legacy system is limited to 65,536 unique access codes, the combined security system will be equally limited. Renner's smart card reader is also installed as a replacement for the legacy card reader. When the legacy card reader is removed, smart cards must be issued to any person needing access to the portal controlled by the smart card reader. Furthermore, Renner's smart card readers are designed for installation in insecure areas, making the security system more vulnerable to attack or vandalism.

U.S. Patent Application No. 2005/0127172 A1 to Merkert, Sr., entitled "Access System," addresses the last of the vulnerabilities mentioned above. Merkert essentially takes Renner's smart card reader and splits it into two components—a new reader intended for installation in the door area, and a signal processor intended for installation in a secure area near the legacy control panel. Merkert's system essentially makes the keys of the legacy system more secure. But Merkert's system, like Renner's system, does not increase the number of keys that the combined security system can handle. If the legacy system is limited to 65,536 unique access codes, the combined Merkert/legacy security system will be equally limited. Also, a party who installs the security systems taught by Merkert would have to use the legacy system's rights management and scheduling software to assign access rights to the credentials carried by the new smart cards.

Merkert also fails to teach or suggest providing tandem access to portals from both a legacy card reader and a newer, more capable smart card reader. Rather, Merkert, like Renner, teaches installing a smart card reader as a total replacement for the legacy card reader. Consequently, smart cards would have to be issued to any person needing access to the portal controlled by the smart card reader.

SUMMARY OF THE INVENTION

This specification sets forth several embodiments of an auxiliary access rights administration system designed to retrofit and modernize legacy security systems without interfering with legacy system operation. These auxiliary access rights systems include secondary control panels intended to be co-located with legacy control panels. The secondary control panels are designed to memorize and feed the legacy control panels the very key codes that the legacy control panels expect to get from legacy readers. The legacy control panels continue to operate the doors in the usual way.

The present invention takes advantage of the fact that virtually all legacy security systems are compliant with the Wiegand protocol for communications between card readers and control panels. In the simplest embodiment, a secondary control panel is installed in proximity with the legacy control panel. Also, a new, secondary token reader is installed in proximity with the legacy Wiegand card reader. The secondary control panel has a legacy Wiegand card reader interface, a legacy control panel interface, and a secondary token reader interface. Both the legacy Wiegand card reader and the new, secondary token reader are wired to the secondary control panel. The secondary control panel, in turn, is wired to the legacy control panel.

When a legacy token is presented to the legacy token reader, the legacy token's credential is transmitted to the secondary control panel. The secondary control panel is configured, in normal operation, to transmit the legacy token credential without functionally consequential alteration to the legacy control panel. This is functionally equivalent to simply passing the Wiegand signal carrying the legacy token credential from the legacy card reader directly to the legacy control panel.

The secondary control panel is also configured to memorize at least one legacy token credential. Subsequently, it uses the memorized legacy token credential when needed to spoof the legacy control panel into opening the door.

When a new, more secure and higher key-capacity secondary token is presented to the secondary token reader, the secondary token credential is transmitted to the secondary control panel. There, the secondary token credential is evaluated against a much larger access rights list administered by the auxiliary access rights administration system. If the secondary token credential is authentic and access is authorized, the secondary control panel then uses the memorized legacy token credential to spoof the legacy control panel into opening the door.

In this manner, the auxiliary access rights administration system provides expanded key capabilities, improved security, and secure network administration capabilities. Each secondary control panel has sufficient capacity to accommodate millions of potential users in a wide area. Each is further designed for quick and easy installation, thereby minimizing the "down-time" of the legacy system. The administration architecture that accompanies the secondary control panels utilize highly secure means for authorized users to administer, via the Internet, the access rights of persons that they supervise. This architecture supports logging of audit information at a central location for analysis of attempted attacks. The architecture also provides support for multiple situations (modes of operation), such as a normal situation, several levels of heightened-security situations, and disaster-response situations.

Advantageously, the auxiliary access rights system enables a customer to gradually migrate from the old security system to a new, more secure system. Over time, the customer can remove the legacy key readers from the building, requiring personnel to use the more secure secondary tokens to access the building's secure areas. The customer, however, may implement this transition period at its convenience and on its own time-frame, because the auxiliary access rights system is designed to minimize interference with legacy system operation.

These and many other embodiments and advantages of the invention will be readily apparent to those skilled in the art from the following detailed description taken in conjunction with the annexed sheets of drawings, which illustrate the invention.

BRIEF DESCRIPTION OF THE DRAWINGS

FIG. 5 is a diagram illustrating one embodiment of a suitable communications protocol between the secondary token of FIG. 4 and the secondary controller of FIG. 2a.

FIG. 6 is a simplified functional block diagram illustrating several operational components of the secondary controller of FIG. 2a.

FIG. 7 is a functional flow diagram illustrating a learning mode of the secondary control panel of FIG. 2a.

FIG. 8 is a functional flow diagram illustrating an operational mode of the secondary control panel of FIG. 2a.

FIG. 9 is a functional flow diagram illustrating the rights-administration mode of the secondary controller of FIG. 2a.

FIG. 10 is a block diagram illustrating the hardware components of one embodiment of the secondary controller of FIG. 2a.

DETAILED DESCRIPTION

Figure 1:
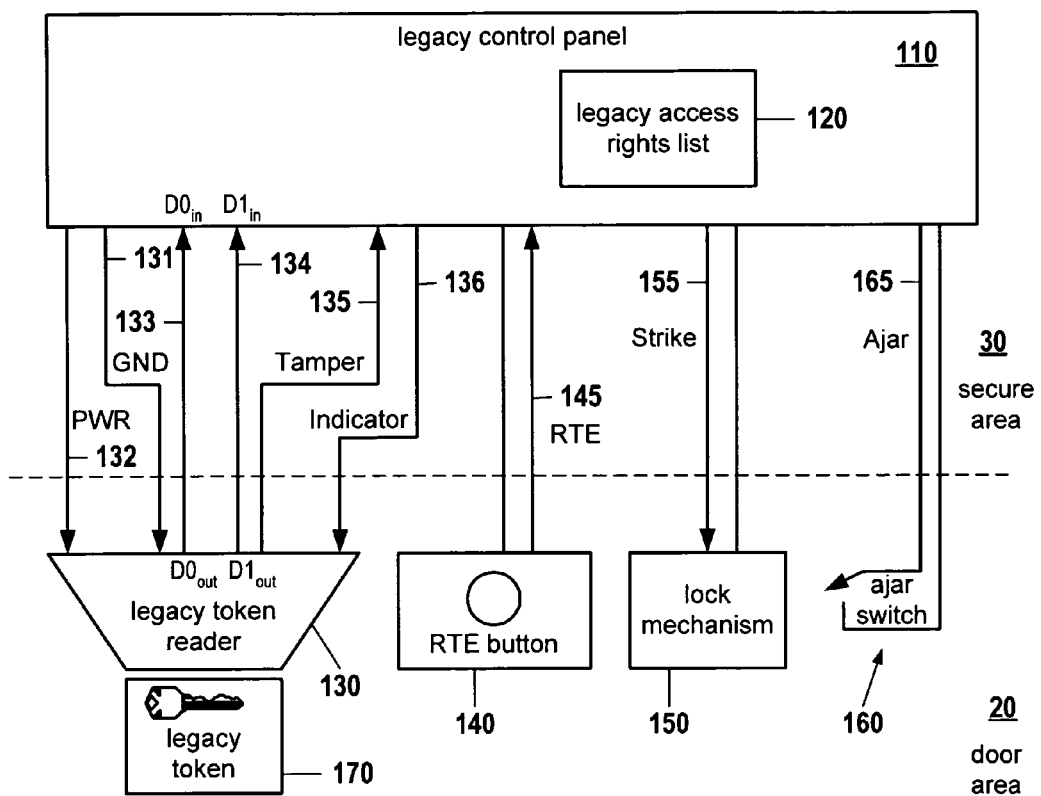
FIG. 1 is a block diagram illustrating a simplified version of a legacy access control security system to which the present invention may be adapted.

Before the subject invention is described further, it is to be understood that the invention is not limited to the particular embodiments of the invention described below or depicted in the drawings. Many modifications may be made to adapt a particular situation, composition, process, process step or steps, to the objective, spirit and scope of the present invention. Therefore, it should be understood that, unless otherwise specified, this invention is not to be limited to the specific details shown and described herein, and all such modifications are intended to be within the scope of the claims made herein.

It is also to be understood that the terminology employed in the Summary of the Invention and Detailed Description sections of this application is for the purpose of describing particular embodiments. Unless the context clearly demonstrates otherwise, is not intended to be limiting. In this specification and the appended claims, the singular forms "a," "an" and "the" include plural references unless the context clearly dictates otherwise. Conversely, it is contemplated that the claims may be drafted to exclude any optional element or be further limited using exclusive terminology as "solely," "only" and the like in connection with the recitation of claim elements or by use of a "negative" limitation. It is also contemplated that any optional feature of the inventive variations described herein may be set forth and claimed independently, or in combination with any one or more of the features described herein.

As used in this application, the terms "computer" and "software" are used in their conventional senses. A computer has a processor, computer memory (such as volatile random-access memory, flash memory, hard drives, floppy drives, compact disk drives, optical drives), one or more input devices (such as computer mice, keyboards, remote control devices, scanners, communication ports, and/or touch screens), and one or more output devices (such as computer monitors, speakers, printers, communication ports, and/or other peripherals). Computers encompass servers, workstations, desktops, laptops, personal digital assistants, processor- and memory-based cell phones, and, increasingly, home entertainment devices such as television sets. Software comprises programs, routines, and symbolic languages stored in the computer's memory to control the functioning of the computer's hardware and direct its operation. A computer software program, module, or application is, in a sense, a configuration of the computer hardware that enables it to perform a function or application. It will be understood that the software programs, modules, and applications described herein covers both fully integrated self-contained lists of instructions, and combinations or packages of multiple independent applications.

FIG. 1 is a block diagram illustrating a simplified version of a legacy access control security system to which the present invention may be adapted. FIG. 1 includes a legacy token reader 130, which will usually be a typical Wiegand card reader that is installed in a door area 20 near the door whose access is controlled. A plurality of wires run between the legacy token reader 130 and a legacy control panel 110, which is installed in a secure area 30 remote from the door area 20, such as a control panel closet. Generally, these wires are in the secured area and are not easily accessible, as they typically run in the walls or ceiling of the building structure, behind wallboard.

The legacy token reader 130 has the following connections to a legacy control panel 110: ground 131, power 132 (typically 5, 12, or 24 VDC), a Data Zero channel 133 for delivering pulses that are interpreted as binary zeros, a Data One channel 134 for delivering pulses that are interpreted as binary ones, a tamper line 135 that goes low if the casing of the reader 130 is compromised or opened, and one or more indicator lines 136 that are used to control a red and/or green indicator on reader 130.

SIA's access control standard specifies that the power line 132 should be red, the ground wire 132 be black, the Data One channel should be white, the Data Zero channel should be green, and the Indicator channel 136 should be brown. The standard also specifies that the token reader 130 provide a means of connection to the cable such as a terminal strip, wire pigtail, manufacturer supplied connector or other suitable connection (not shown) for its intended application. The control panel 110, likewise must provide a means of connection to the interface cables, such as a terminal strip, a wire pigtail, and a manufacturer supply connector or other suitable connection (not shown).

Although not shown in FIG. 1, the legacy control panel 110 may simultaneously operate several legacy token readers 130 controlling different doors. To the extent that legacy control panel 110 is operable to control multiple doors, separate sets of Data Zero and Data One channel inputs are provided to interface with each legacy token reader.

The legacy access control security system also includes a request-to-exit (RTE or Egress) button 140 on the secure side of the door. An RTE channel 145 connects the RTE button 140 to the legacy control panel 110. The legacy control panel controls a lock mechanism 150, such as a door strike, electromagnetic lock, or moving barrier, via signals carried through a strike channel 155. A door ajar switch 160 connected to the legacy control panel 110 via a data channel 165 alerts the legacy control panel 110 if the door or portal is open. There are no widely accepted industry standards for how the RTE button 140, lock mechanism 150, and door ajar switch 160 are wired or connected to the legacy control panel 110. Typical legacy control panels include boxes with helper circuits that contain power supplies and relays to control the lock mechanism 150. Because these power supplies and relays are relatively expensive devices, it is desirable to make use of existing lock mechanism hardware when upgrading a security system.

Figure 2A:
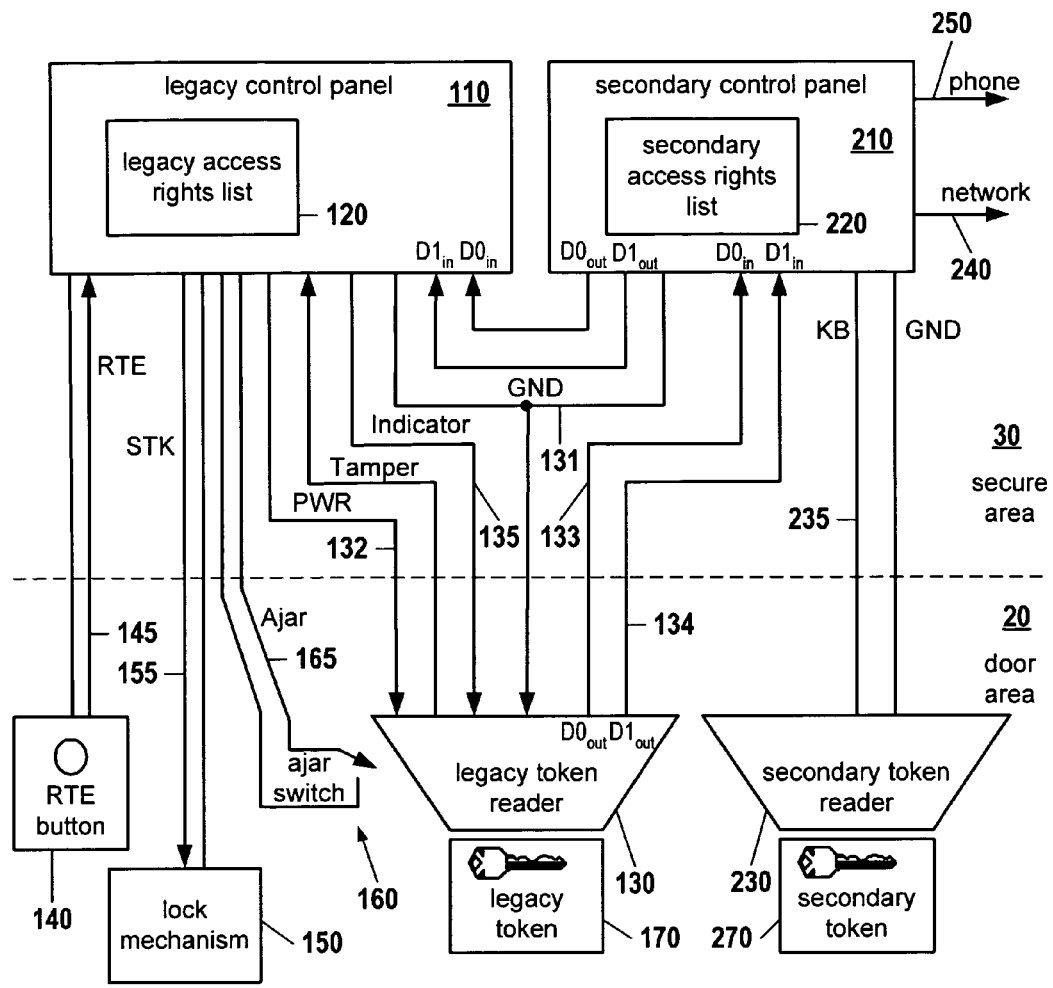
FIG. 2a is a block diagram of a legacy security system retrofitted with one embodiment of the upgrade apparatus of the present invention.
Figure 2B:
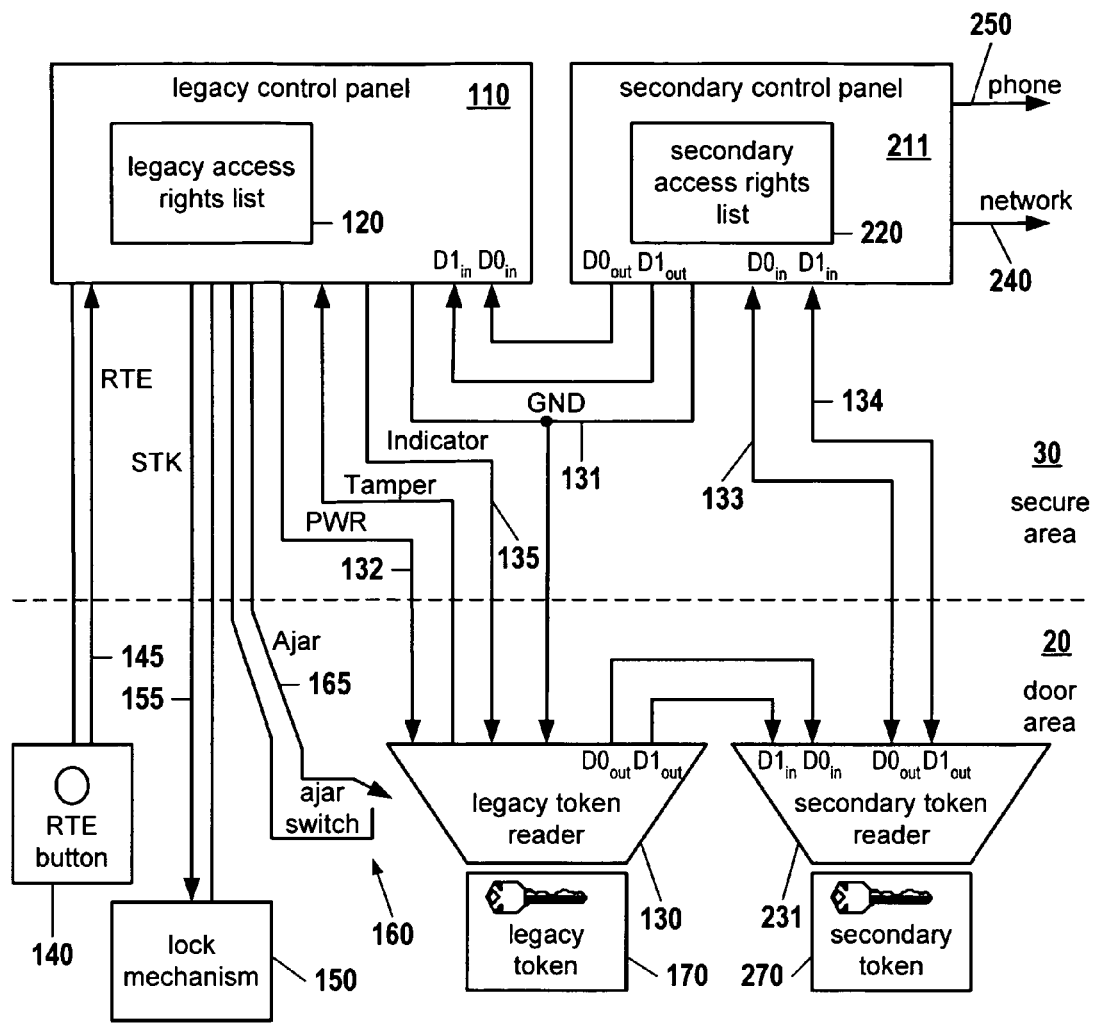
FIG. 2b is a block diagram of a legacy security system retrofitted with a second embodiment of the upgrade apparatus of the present invention.

FIGS. 2a and 2b are block diagrams of a legacy security system retrofitted with two different embodiments of the upgrade or improvement apparatus of the present invention. In the embodiment of FIG. 2a, the upgrade apparatus comprises a secondary control panel 210 installed in the same secure area 30 as, and preferably co-located with, the legacy control panel 110. The secure area 30 will generally be remote from the door area 20. The upgrade apparatus further comprises a secondary token reader 230 installed in the door area 20 with the legacy token reader 130. The secondary token reader 230 is operable to read keys from one or more secondary tokens 270. FIG. 2a depicts a key bus 235 line between the secondary token reader 230 and the secondary control panel 210.

The Data Zero channel 133 and Data One channel 134 that formerly connected the legacy token reader 130 to the legacy control panel 110 now connect the legacy token reader 130 to the secondary control panel 210. Three newly installed wires provide a common ground between the legacy control panel 110 and the secondary control panel 210 and connect the Data Zero and Data One outputs from the secondary control panel 210 to the Data Zero and Data One inputs of the legacy control panel 110.

The legacy control panel 110 and secondary control panel 210 each administer their own respective and independent access rights lists 120 and 220, including separate access rights schedules and situation mode settings. Typically, the cryptographic and key-capacity capabilities of the secondary access rights list 220 will far exceed that of the legacy access rights list 120. In operation, the legacy token reader 130 will transmit a credential from a legacy token 170 to the secondary control panel 210, which in normal operation will reproduce the credential, without functionally consequential alteration, to the legacy control panel 110. The legacy control panel 110 will then use the legacy access rights list 120 to grant or deny access to the holder of the legacy token 170. In this manner, the readers 130, tokens 170, and control panel 110 of the legacy control system continue to operate in FIG. 2a the same way they did in FIG. 1.

Secondary tokens 270 are evaluated differently than legacy tokens 170. In operation, the secondary token reader 230 will transmit a secure secondary system credential from a secondary token 270 to the secondary control panel 210. The secondary control panel 210 will then use the secondary access rights list 220 to grant or deny access to the holder of the secondary tokens 270. If access is authorized, the secondary control panel 210 transmits a memorized legacy credential to the legacy control panel 110. The memorized legacy credential will have previously been set up in the legacy access rights list 120 to open the lock mechanism 150 at all times. In short, the secondary control panel 210 operates its own secondary access rights list 220, and then simply uses the legacy system's mechanisms to open the door.

The secondary control panel 210 also preferably has a network interface 240 (e.g., Ethernet 10/100 port) and a regular telephone jack 250 to provide communications between the secondary control panel 210 and a remote server or computer (not shown in FIG. 2a) to update and administer the secondary control panel 210.

FIG. 2b depicts an alternative embodiment of a secondary token reader 231 that has no key bus 235 line running to the secondary control panel 211. Rather, in this embodiment, the Data Zero and Data One outputs from the legacy token reader 130 are fed directly into corresponding Data Zero and Data One inputs for the secondary token reader 231. The old legacy wires 133 and 134 are then used to connect Data Zero and Data One outputs from the secondary token reader 231 to the Data Zero and Data One inputs of the secondary control panel 211. This alternative embodiment dispenses with the need to install any new wires whatsoever between the secure area 30 and the door area 20. With this embodiment, it is contemplated that the secondary token reader could be installed where the legacy token reader had been installed. A housing for the secondary token reader 231 may be provided that includes a mounting bracket or mounting plate (not shown) for attaching the legacy token reader 130.

Figure 3:
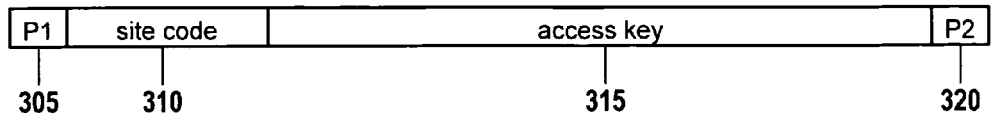
FIG. 3 is a block diagram illustrating the standard format of a typical 26-bit Wiegand data stream carrying a 16-bit access key typical for many legacy security systems.

FIG. 3 is a block diagram illustrating the standard format of a typical 26-bit Wiegand data stream carrying a 16 bit access key typical for many legacy security systems. The first bit of the data stream is an even parity bit P1 or 305. Typically this is followed by an eight bit facility or site code 310. This is typically followed with a 16 bit access key 315 and then an odd parity bit P2 or 320. Thus, a typical 26-bit Wiegand legacy security system has a maximum capacity of 65,536 access keys.

Figure 4:
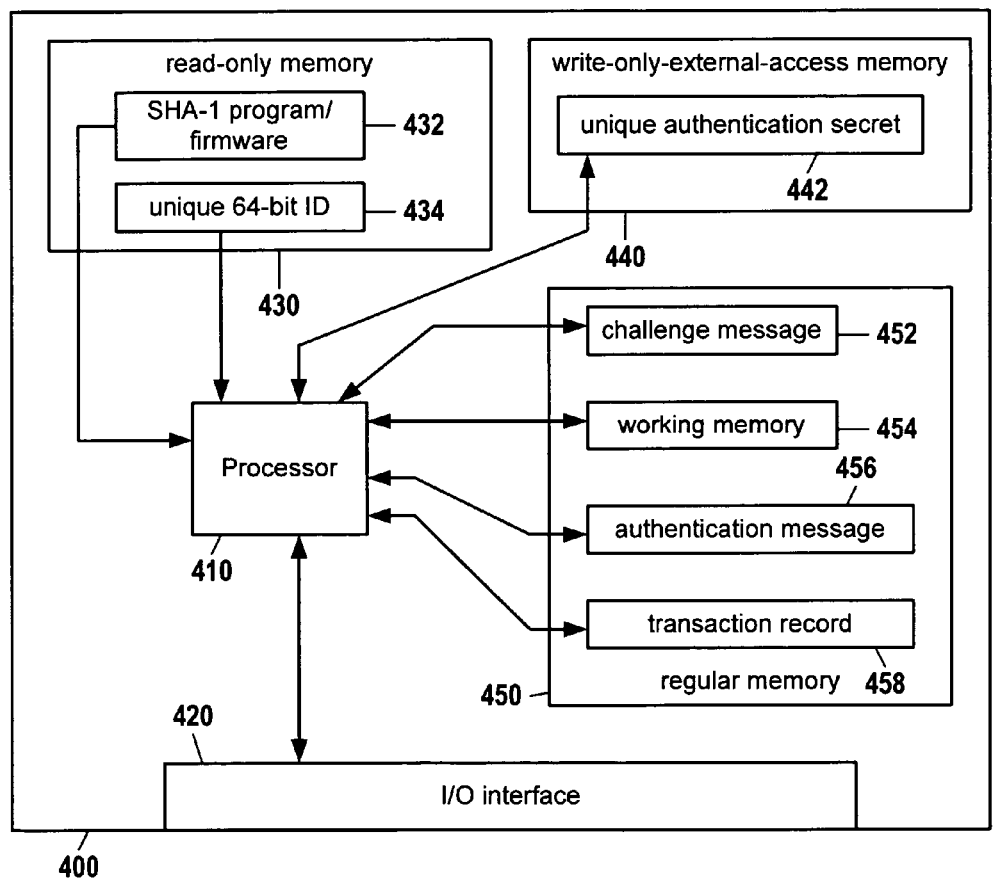
FIG. 4 is a diagram illustrating functional components of a preferred embodiment of a secondary token for use with the upgrade apparatus of the present invention.

FIG. 4 is a diagram illustrating functional components of a preferred embodiment of a secondary token 400 for use with the upgrade apparatus of the present invention. Secondary token 400 comprises a processor 410, an input/output interface 420, and a plurality of memory components. Secondary token 400 includes a read only memory 430 which stores a unique 64 bit identification number 434 and a secure hash algorithm program 432 known as "SHA-1". SHA-1 is a cryptographically strong hash function that meets a standard specified in Federal Information Publications 180-1 and 180-2. The SHA-1 hash function creates a 160-bit hash from one or more input blocks of 512 bits. This hash is impossible to generate without knowledge of the secret portion of its input, and so prevents an attacker from being able to emulate a valid key or use an altered key.

The secondary token 400 also includes an internal-read/external-write-only memory 440 which is not externally readable. Memory 440 is used to store a unique authentication secret 442 which is used as one of the inputs to the SHA-1 program 432. Secondary token 400 also includes regular memory 450 for storing a challenge message 452, an authentication message 456, and a transaction record 458. Regular memory 430 also serves as working memory 454 for storing temporary variables and registers during the execution of the SHA-1 program 432.

A suitable secondary token 400 for use with the present invention is a computer chip enclosed in a rugged and durable 16 mm stainless steel can (about the size of a button) marketed as the iButton® by Dallas Semiconductor Corp. of Dallas, Tex., and Maxim Integrated Products, Inc., of Sunnyvale, Calif. This steel button is designed to withstand harsh environments and can be attached to a key fob. Each button comes with a unique, unalterable factory-lasered 64-bit address that can be used for a secure key or identifying credential. The iButton® has a simple electrical interface—a single data line and a ground reference. Suitable secondary readers 230 for use with the iButton® include many of the touch probes listed by Dallas Semiconductor Corp. and Maxim Integrated Products and accessible through the website www.ibutton.com.

Figure 5:
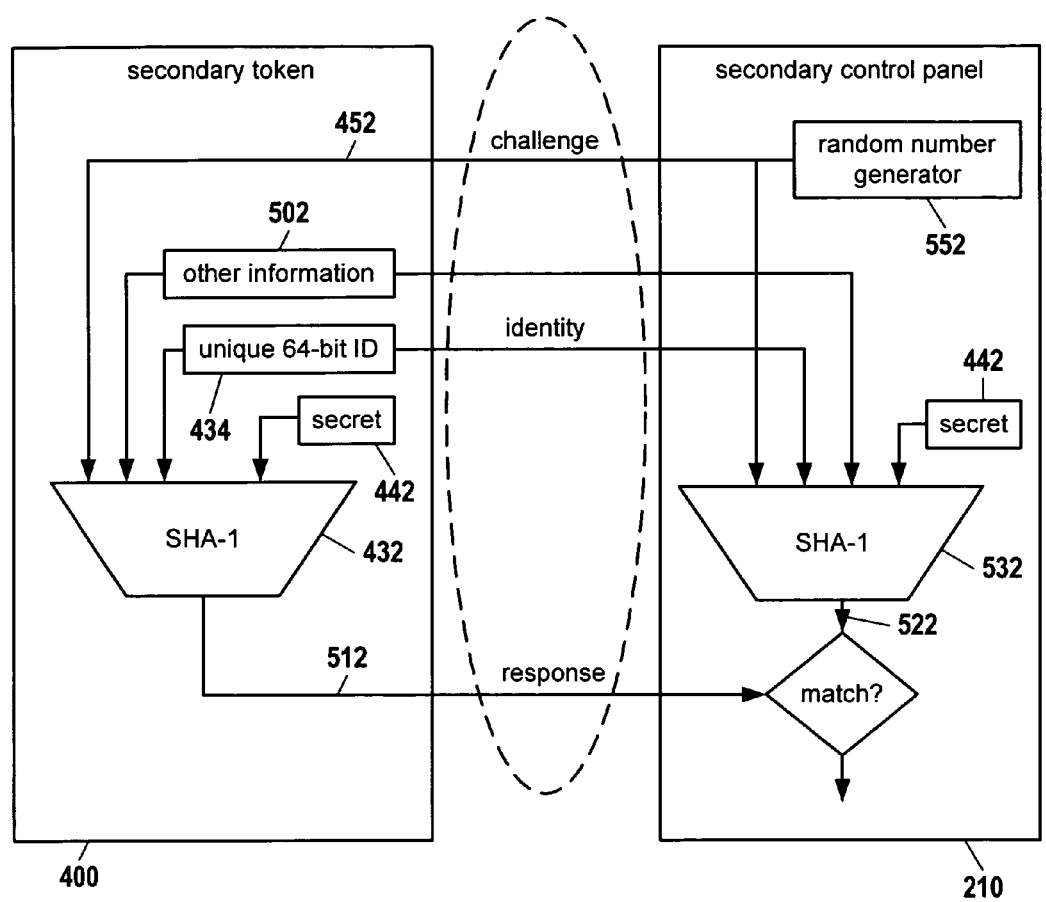

FIG. 5 is a diagram illustrating one embodiment of a suitable communications protocol between the secondary token 400 of FIG. 4 and the secondary control panel 210 of FIG. 2a. As seen in FIG. 5, the secondary control panel 210 includes a random or pseudo-random number generator 552 that generates and transmits a challenge message 452 to the secondary token 452. The SHA-1 program 432 takes the following inputs: the challenge message 452, the unique 64-bit ID 434, the unique authentication secret 442, and optionally other information 502, such as a transaction id or a service data page number. From these multiple inputs the SHA-1 program 432 generates a message authentication code 512, which is communicated from the secondary token 400 to the secondary control panel 210.

As shown in FIG. 5, the unique 64-bit ID 434 of the secondary token 400 and the other information 502 is also communicated to the secondary control panel 210. The secondary control panel 210 also embodies a SHA-1 program 532 and stores the unique authentication secret 442 (or some component from which the secret 442 can be derived). The SHA-1 program 532 processes the same input information as SHA-1 program 432, including the challenge message 452, the other information 502, the unique 64-bit ID 434 received from the secondary token 400, and the secret 442. From these inputs, the SHA-1 program 532 generates its own message authentication code 522, which it compares with the message authentication code 512 received from the secondary token 400. A match between the MAC 512 and the MAC 522 indicates that the token is authentic. Once authenticated, the secondary control panel then looks up the unique 64 bit-ID 434 and the current access request time against secondary access rights list 220 to determine whether the access should be granted to the holder of the token 400.

Figure 6:
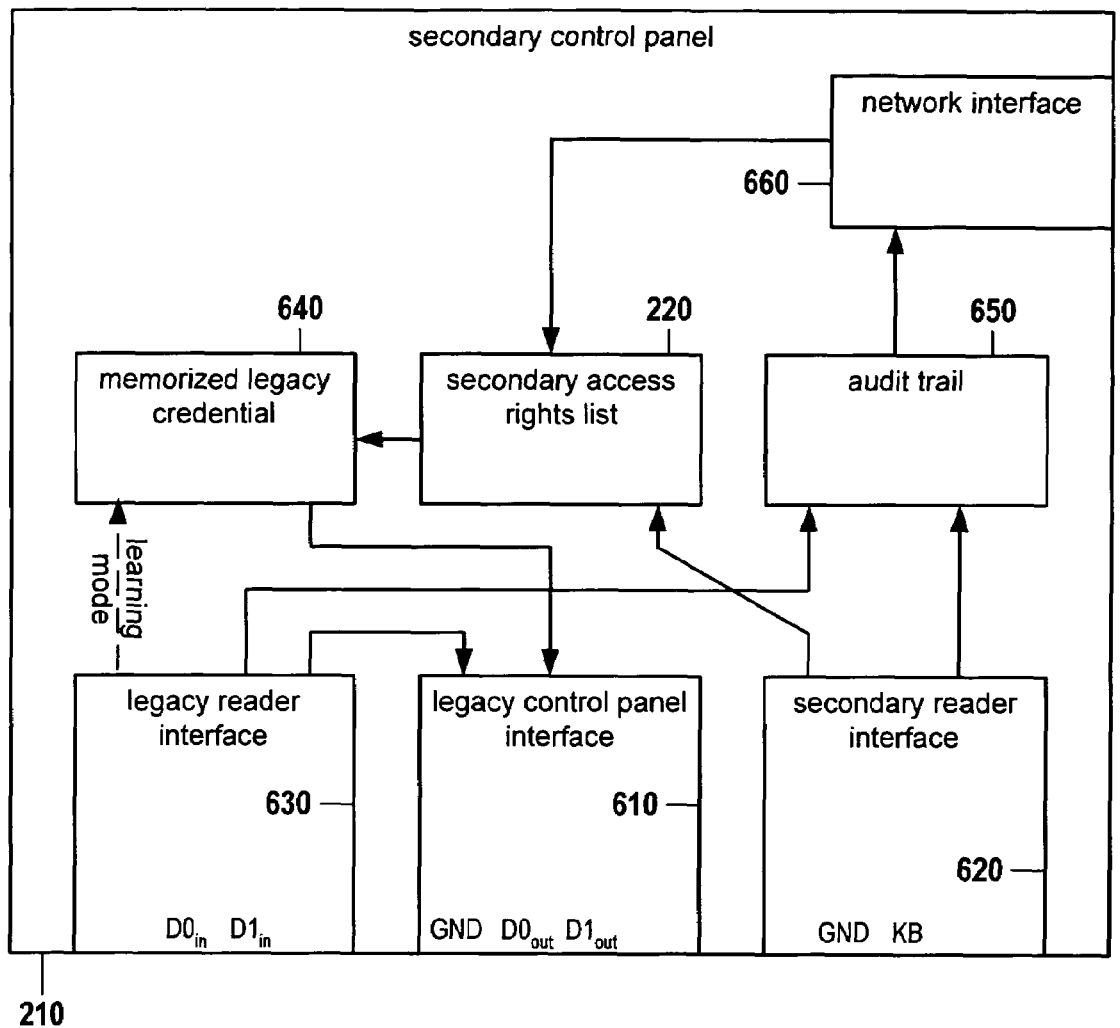

FIG. 6 is a simplified functional block diagram illustrating several interesting operational components of the secondary controller 210 of FIG. 2. The secondary control panel 210 includes a legacy control panel interface 610, a legacy reader interface 630, and a secondary reader interface 620 equipped with secure authentication capabilities. The legacy reader interface 630 includes Data Zero and Data One inputs. The legacy control panel interface 610 includes Data Zero and Data One channel outputs and a connection for maintaining a common ground between the secondary control panel 210 and the legacy control panel 110. The secondary reader interface 620 includes key bus and ground connectors for connecting to a secondary token reader 230. The secondary control panel 210 also includes memory for storing a secondary access rights list 220, an audit trail 650 for logging all attempts to access the system, and a memorized legacy credential 640, which is described further below in connection with FIG. 7.

In normal operation, the secondary control panel 210 takes communications received from the legacy reader interface 630 and reproduces them without functionally consequential alteration at the legacy control panel interface 610. The secondary control panel 210 does not attempt to authenticate credentials received from the legacy reader interface 630 or look those credentials up in the secondary access rights list 220. Rather, such credentials will be processed by the legacy control panel 110 as if it had received them directly from the legacy token reader 130.

Preferably, the secondary control panel 210 also has the capability, upon proper configuration, of blocking legacy key reads from being relayed to the legacy panel in certain situations (modes). An administrator may elect to have the legacy keys stop working under some circumstances. For example, in a lockdown situation, the secondary control panel may be configured to block passage of legacy key data to the legacy panel.

Attempts to access a portal using a secondary token 270 triggers the authentication process of FIG. 5 followed by a lookup of an authenticated token credential in the secondary access rights list 220. If it is determined that the holder of a secondary token should be granted access to a portal, then a memorized legacy credential 640 is communicated through the legacy control panel interface 610 to the legacy control panel 110 in accordance with SIA's access control standard protocol for Wiegand reader interfaces.

Figure 7:
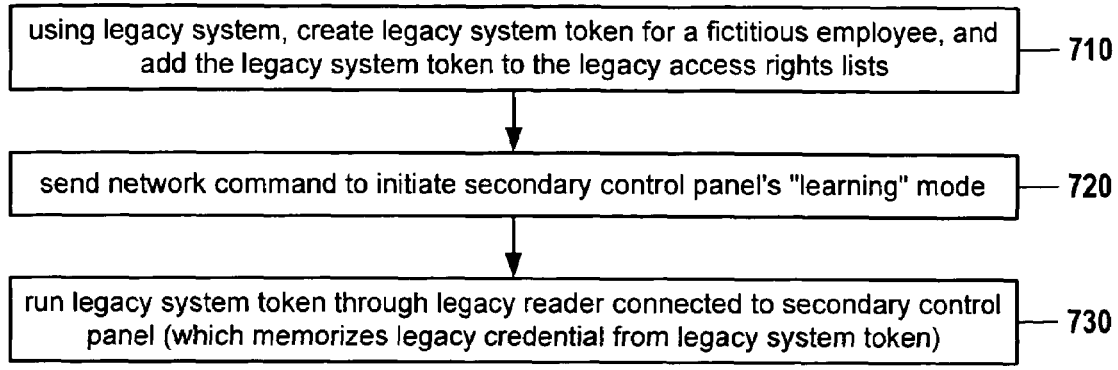

FIG. 7 is a functional flow diagram illustrating a legacy credential memorization mode of the secondary control panel 210 of FIG. 6. In functional block 710, the legacy system is used to create a legacy system token 170 for a fictitious employee. Preferably, maximum access rights are assigned to the credential 640 associated with the legacy system token 170.

In functional block 720, a network command is used to initiate the secondary control panel 210's "learning" mode. In functional block 730, the legacy system token 170 is run through a legacy reader 130 connected to the secondary control panel 210. In the "learning" mode, secondary control panel 210 memorizes the legacy credential 640 from the legacy system token 170. Subsequently, the secondary control panel 210 can use this single credential 640 to spoof the legacy control panel 110 into opening the door whenever an authorized secondary token 270 is presented to the secondary token reader 230 under the conditions set forth in the secondary access rights list 220.

Figure 8:
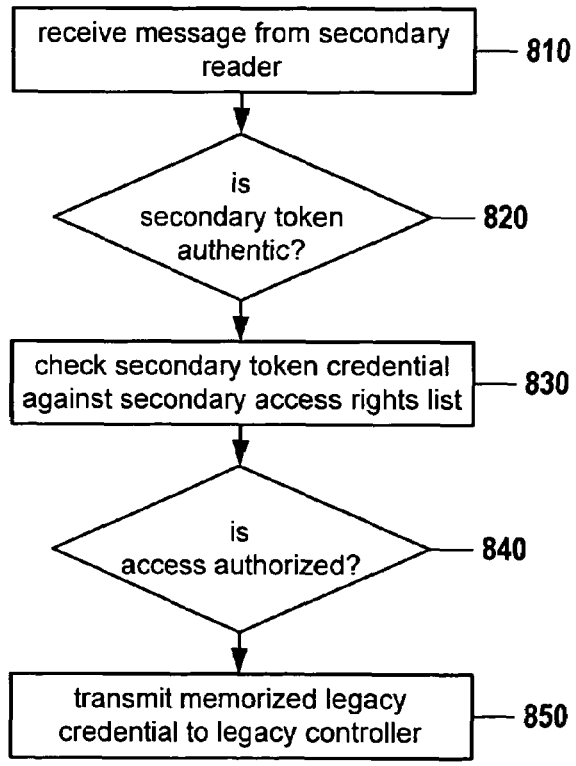

FIG. 8 is a functional flow diagram illustrating an operational mode of the secondary control panel 210 of FIG. 6. In function block 810, the secondary control panel 210 receives a message (including a credential) from the secondary reader 230. In function block 820, a secure hash algorithm is executed to determine whether the secondary token is authentic. Once the message is authenticated, then in function block 830, the secondary token credential is checked against a secondary access rights list 220. If all of the conditions of the secondary access rights list are met for that token credential, then in function block 840, an access authorization signal is generated. In function block 850, a secondary control panel 210 transmits the memorized legacy credentials 640 to the legacy control panel 110 in response to the access authorization signal that was generated in function block 840.

Figure 9:
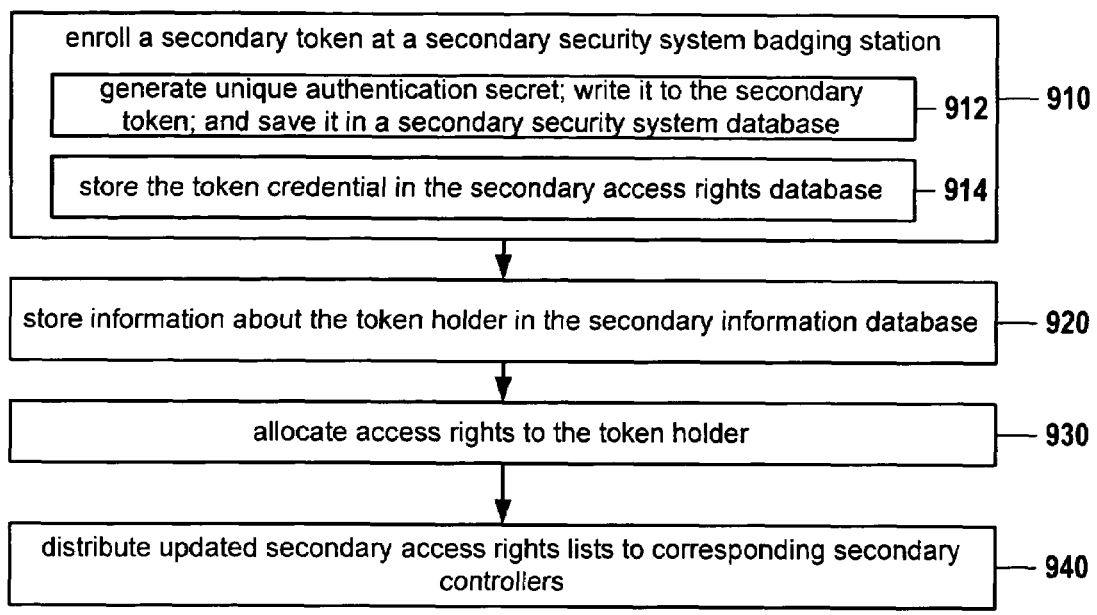

FIG. 9 is a functional flow diagram illustrating the rights management mode of the secondary controller 210 of FIG. 6. In function block 910, a secondary token 270 is enrolled at a secondary controller badging station. This enrollment process includes, in function block 912, generating a unique authentication secret 442, writing it to the secondary token 270, and saving it in a secondary controller database (see FIG. 18). The enrollment process also includes, in function block 914, storing the token credential in a secondary access rights database. In function block 920, information about the token holder—for example, the name, a picture of the token holder, biometric information, etc.—is stored in the secondary access rights database. In function block 930, access rights are allocated to the token holder. In function block 940, the updated secondary access right lists are distributed to corresponding secondary controllers 210.

Figure 10:
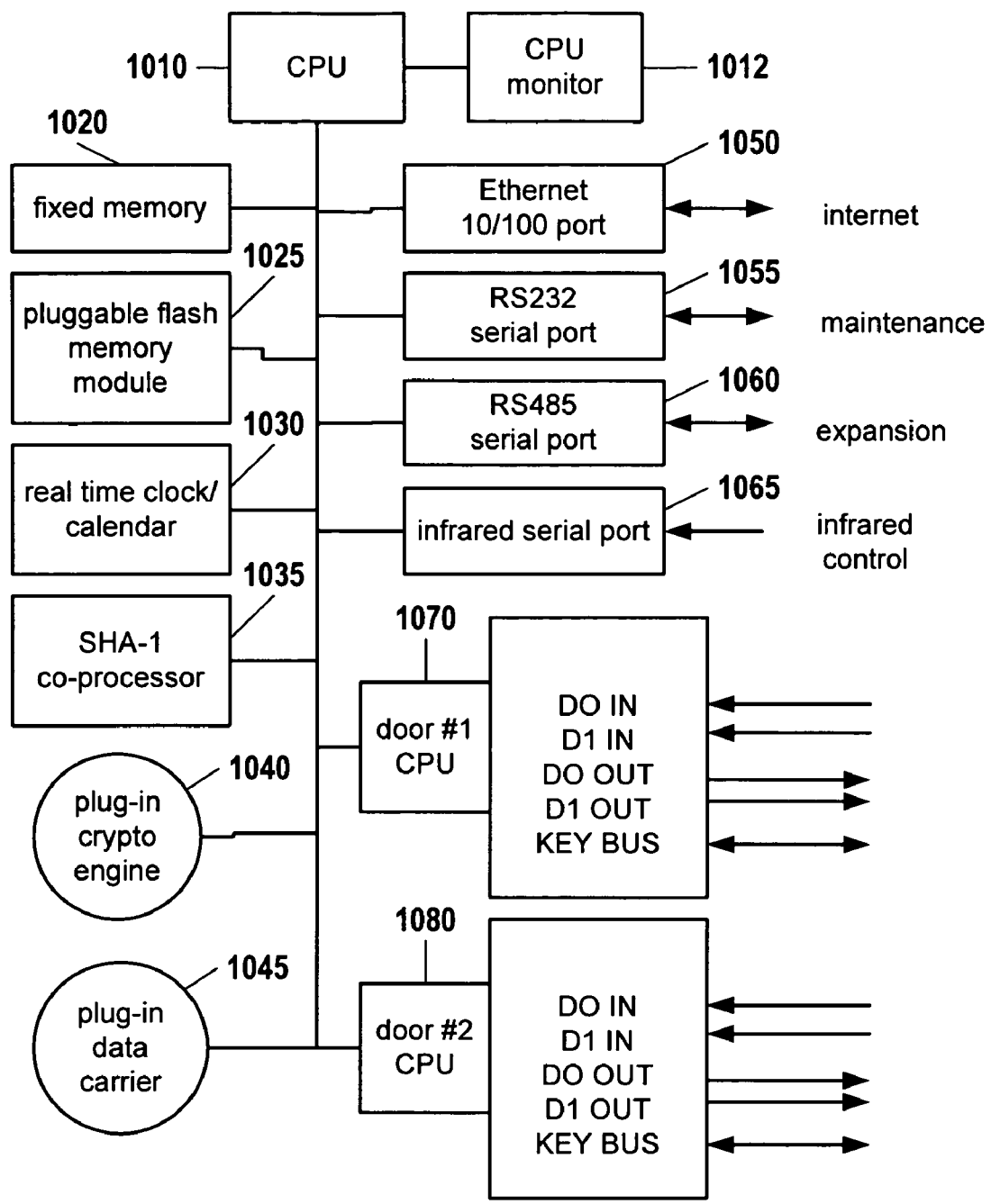

FIG. 10 is a block diagram illustrating the hardware components of one embodiment of the secondary controller 210 of FIG. 2. Secondary controller 1000 comprises a high speed central processing unit 1010, 4 megabytes of onboard flash memory 1020 (which functions as a program store and working memory for the CPU 1010), and a flash memory socket 1025 that can receive flash memory cards holding as much as 4 gigabytes. The flash memory card is used to store access rights, configuration memory, and audit trail information. The secondary controller 1000 also includes a real time clock 1030, which is used when logging audit trail information and for evaluating the time of an access request against the access rights schedule.

The secondary controller 1000 also includes a dedicated SHA-1 coprocessor 1035. A suitable SHA-1 coprocessor 1035 is an 8-pin integrated circuit made by Dallas Semiconductor and designed to work with Dallas Semiconductor's iButton® tokens. Secondary controller 1000 also includes a plug-n data carrier 1045 which is an iButton® socket for an iButton® used to store the IP address, subnet mask, name, identification and other configuration details used to configure the controller 1000. The secondary controller 1000 also includes a plug-in crypto engine 1040 socket. This socket is designed to receive an optional iButton® that performs highly advanced cryptography.

The secondary controller 1000 also includes a CPU monitor 1012. The CPU monitor 1012 is a separate eight-pin CPU that watches the power supply, monitors the CPU 1010, and is operable to force a hardware reset if it detects that the CPU 1010 has hung or the power supply is not functioning properly. Secondary controller 1000 also includes an Ethernet 10/100 port, preferably with power-over-Ethernet capabilities, to connect the secondary controller 1000 to the Internet. The secondary controller 1000 also includes an RS232 serial port 1055 which is suited for connecting the controller 1000 to a laptop or to a cellular packet radio. The secondary controller 1000 further includes an RS485 serial port 1060 which is well suited for connection with elevator relay boxes. Secondary controller 1000 also includes an infrared serial port 1065. This is intended to enable an installer to remotely open doors and test various aspects of the installation using a remote control unit.

Secondary controller 1000 also includes a door #1 CPU 1070 with a corresponding input/output interface and a door #2 CPU 1080 with a corresponding input/output interface. CPU's 1070 and 1080 are low cost chips that run algorithms to read and emulate Wiegand signals. These CPU's 1070 and 1080 are also designed to reproduce communications from a legacy reader 130 received at the Data Zero and Data One channel inputs at the Data Zero and Data One channel outputs. The door #1 and door #2 CPU's 1070 and 1080 also handle communications from the key bus lines 235 that are connected to the secondary token readers 230. Although not depicted in FIG. 10, the door #1 and door #2 CPU's 1070 and 1080 also preferably provide supervised ajar, tamper, and RTE inputs, and also control four fully isolated high current solid state strike and auxiliary drivers, to enable the secondary controller 1000 to function as a full fledged controller.

Figure 11:
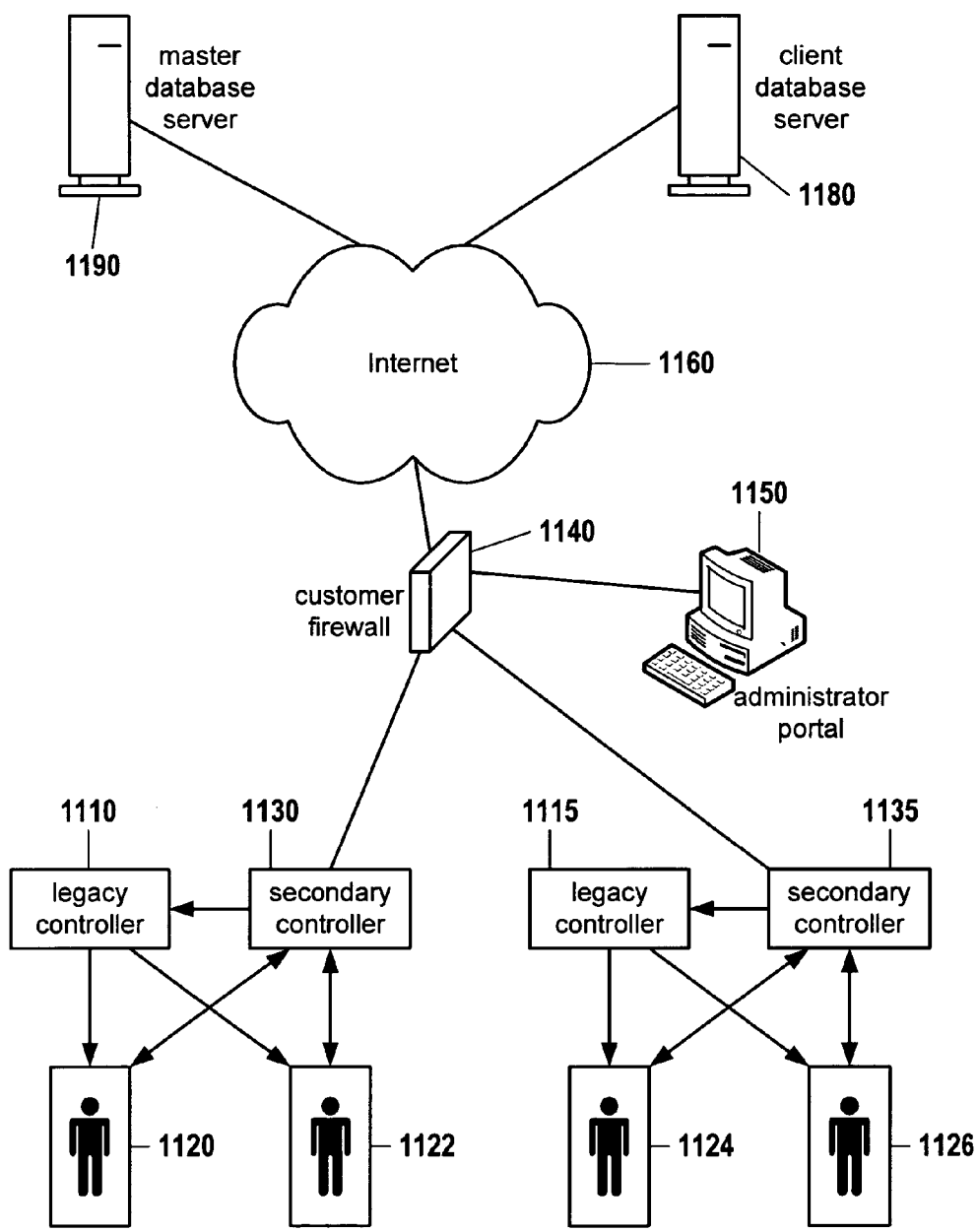
FIG. 11 is a block diagram of a multiple-panel embodiment of the present invention for use with a single-site security system.

FIG. 11 is a block diagram of a multiple-panel embodiment of the present invention for use with the single-site security system. A typical authorization and privilege control system comprises a plurality of legacy controllers 110 connected to a plurality of card readers. In many situations a single legacy controller 110 will operate two or more card readers for two or more doors. In FIG. 11, it is contemplated that a secondary controller will be installed in close proximity to each of several legacy controllers. FIG. 11 depicts two different legacy controllers 1110 and 1115. Legacy controller 1110 is connected to a first portal or door 1120 and a second portal or door 1122. Legacy controller 1115 is connected to a third portal or door 1124 and a forth portal or door 1126. In FIG. 11, a secondary controller 1130 is mounted proximate legacy controller 1110. Another secondary controller 1135 is mounted proximate legacy controller 1115. In each case the Data Zero and Data One channels originating from each portal or door 1120, 1122, 1124, and 1126, are rerouted through the secondary controller 1130 and secondary controller 1135. Furthermore, new secondary token readers (not shown) are installed next to each legacy token reader at each of the portals 1120-1126.

Secondary controllers 1130 and 1135 are typically connected to the Internet 1160 via firewall(s) 1140. Access rights for the secondary controllers 1130 and 1135 are administered through an administrator portal 1150 that is remote from the secondary controllers 1130 and 1135. Each administrator portal is equipped with a special application that enables secure communications with a database server 1180. The database server 1180 maintains an information database, rights database, and audit database, each of which are described in more detail in connection with FIG. 18. In most embodiments it is contemplated that the database server 1180 will either be owned and operated by the customer or leased from a service provider.

In one embodiment, a master database server 1190 operated by the Department of Homeland Security, or one of its agencies or regional authority committees, is set up to communicate situation modes across the network 1160 to the database server 1180 of each and every customer equipped with systems of the present invention.

Figure 12:
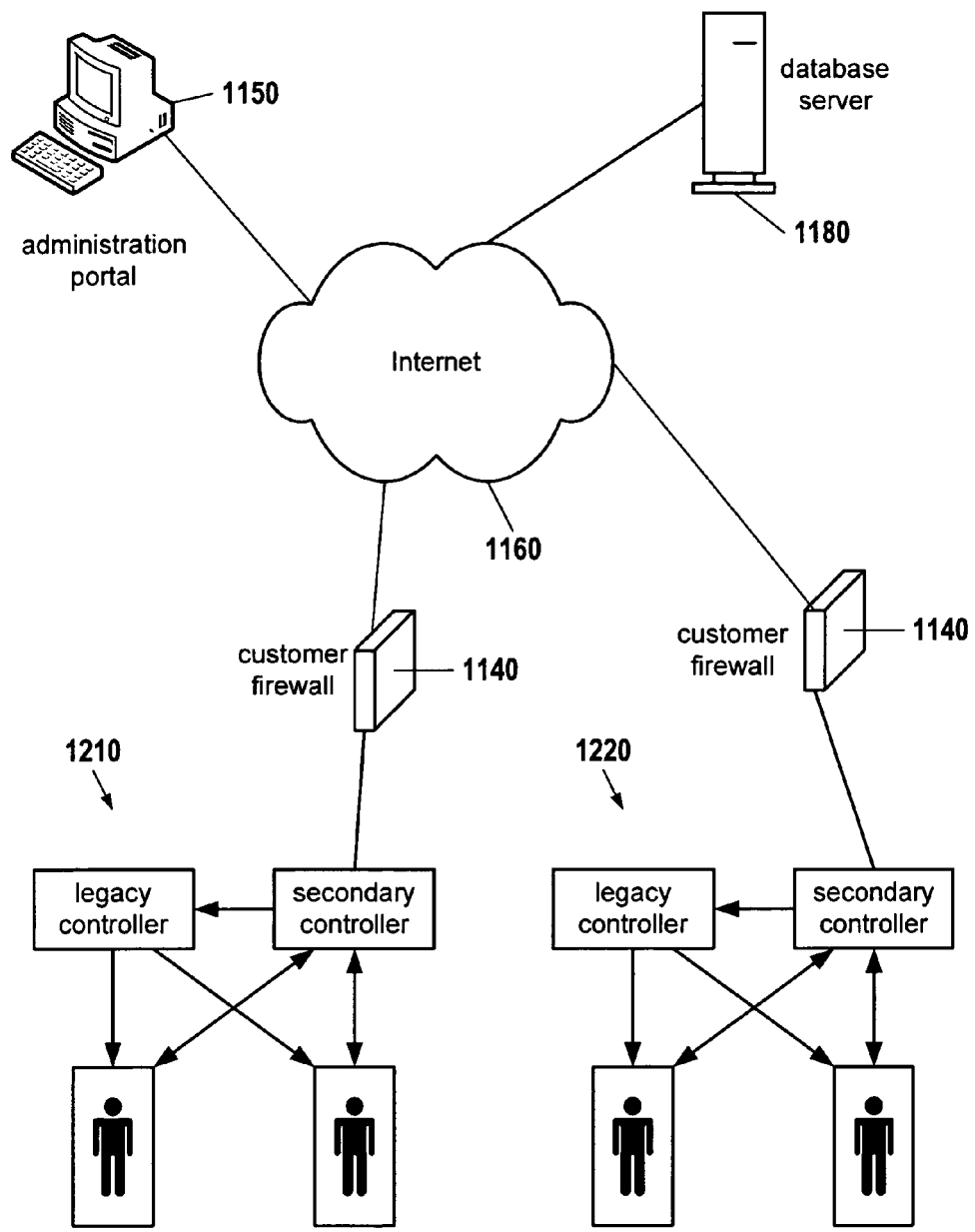
FIG. 12 is a block diagram of a multiple-panel embodiment of the present invention for use with a multiple-site security system.

FIG. 12 is a block diagram of a multiple-panel embodiment of the present invention for use with a multiple-site security system. In this embodiment, the customer has legacy security systems installed at several remote buildings. For example, a first legacy security system 1210 is located at a headquarters building on one side of town and a second legacy security system 1220 is located in a warehouse on the other side of town. In this example, the first legacy security system 1210 is incompatible with the second legacy security system 1220. By upgrading each of the systems with secondary controllers of the present invention, and administering access rights through the secondary controllers, a single token can be used to access both systems 1210 and 1220. In this manner, the present invention provides a common security system for both customer sites.

Figure 13:
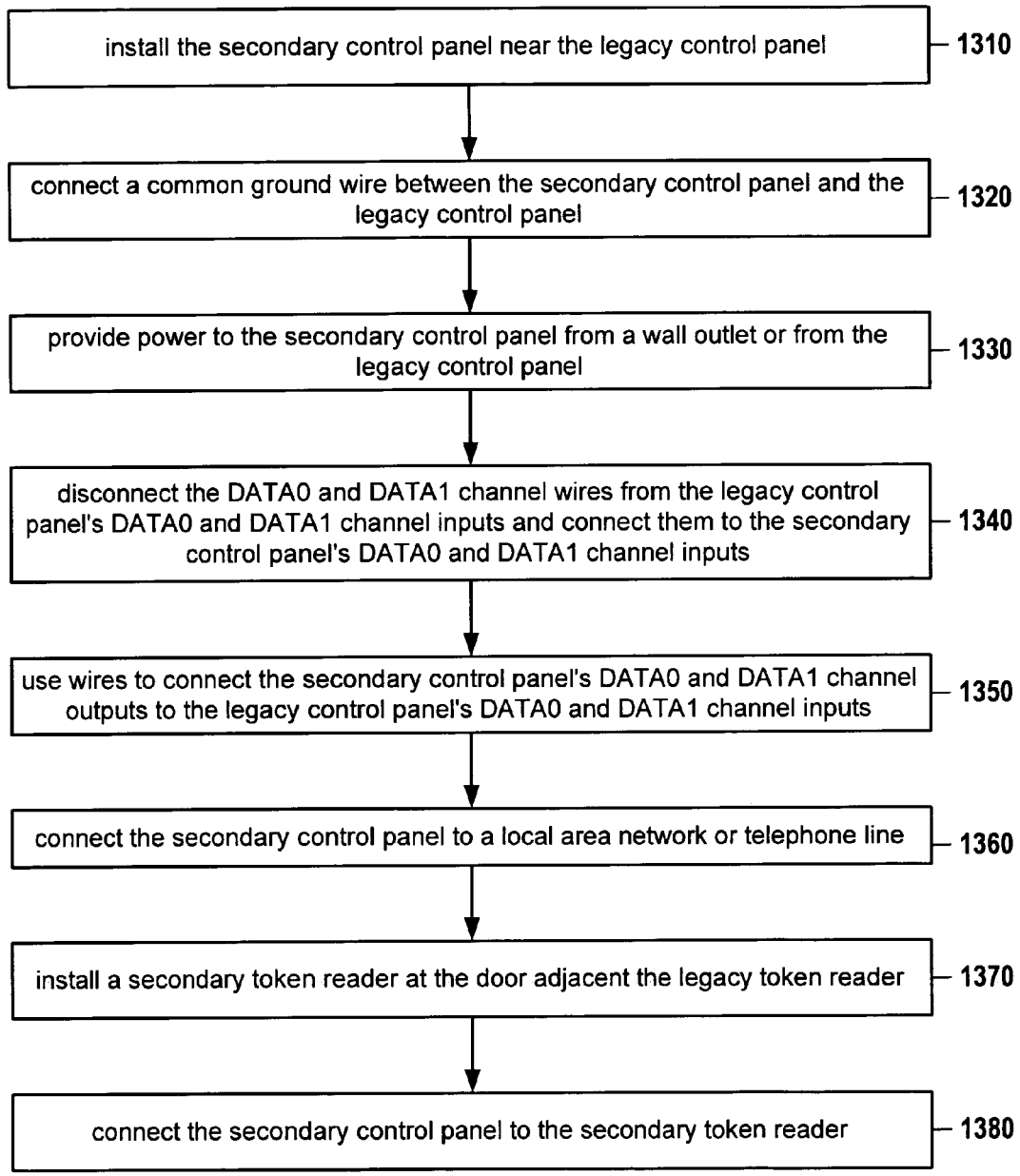
FIG. 13 is a functional block diagram of one embodiment of a method of integrating the upgrade apparatus of the present invention with a legacy security system.

FIG. 13 is a functional block diagram of one embodiment of a method of integrating the upgrade apparatus of the present invention with a legacy security system. In function block 1310, install the secondary control panel near the legacy control panel. In function block 1320, connect a common ground wire between the secondary control panel and the legacy control panel. In function block 1330, provide power to the secondary control panel from a wall outlet or from the legacy control panel. In function block 1340, disconnect the green Data Zero wire and the white Data One wire from the Data Zero and Data One channel inputs of the legacy control panel. Connect the green Data Zero and white Data One wires to the Data Zero and Data One channel inputs of the secondary control panel. In function block 1350, provide separate wires to connect the secondary control panel's Data Zero and Data One channel outputs to the legacy control panel's Data Zero and Data One channel inputs. In function block 1360, connect the secondary control panel to a local area network or telephone line. In function block 1370, install a secondary token reader at the door in proximity to the legacy token reader. In function block 1380, connect the secondary control panel to the secondary token reader.

Figures 14, 15:
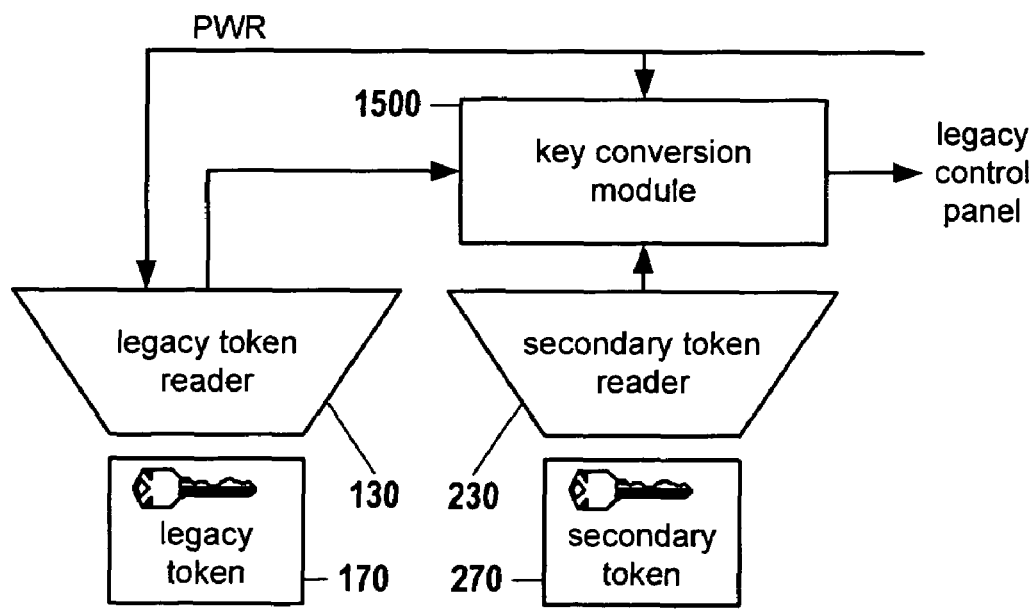
FIG. 14 is a table illustrating one embodiment of an access rights list maintained by the secondary controller.
FIG. 15 is a block diagram illustrating one embodiment of an key conversion module for reading a legacy-system access key held by a secondary token and transmitting it onto the legacy wires connecting the legacy reader to the legacy control panel in a format recognizable by said legacy control panel.

FIG. 14 is a table illustrating one embodiment of an access rights list maintained by the secondary controller. Column 1410 displays a list of secondary token credentials that have access rights to one or more portals of the system. Columns 1420, 1430, and 1440 allocate access rights for three different situation modes for Door #1. Columns 1450, 1460, and 1470 allocate access rights for three different situation modes for Door #2. FIG. 14 is illustrative only. A typical access rights list may contain a much different and much larger mix of situation modes, and may also limit access rights to specific times of the day or night and specific days, weeks, and months of the year. Furthermore, a typical access rights system may also require key pairing. For example, in the lockdown mode 1430 or 1460, the system may require two or three different keys be presented at the door within a few seconds of each other in other to gain access. One of the secondary keys might be a pin number or a biometric. Another situation might require that a certain key be presented along with a supervisory key to gain entry.

FIG. 15 is a block diagram illustrating one embodiment of a key conversion module 1500 for reading a legacy system access key held by a secondary token 270 and transmitting it on to the legacy Wiegand wires connecting the legacy reader to the legacy control panel, in a Wiegand format recognizable by the legacy control panel. The key conversion module 1500 is intended for legacy system doors that have not been upgraded with the secondary controllers 210 of the present invention. For example, a secondary token could be programmed to carry a small 16-bit credential typically carried by the legacy system's tokens. Alternatively, a 16-bit legacy credential could be embedded in a secondary token's more elaborate credential. The key conversion module 1500 would be operable to read the 16-bit legacy credential directly from the secondary token, or to extract a 16-bit legacy credential from a more elaborate credential. Secondary token reader 230 and key conversion model 1500 will generally be installed proximate the legacy token reader 130.

Figure 16:
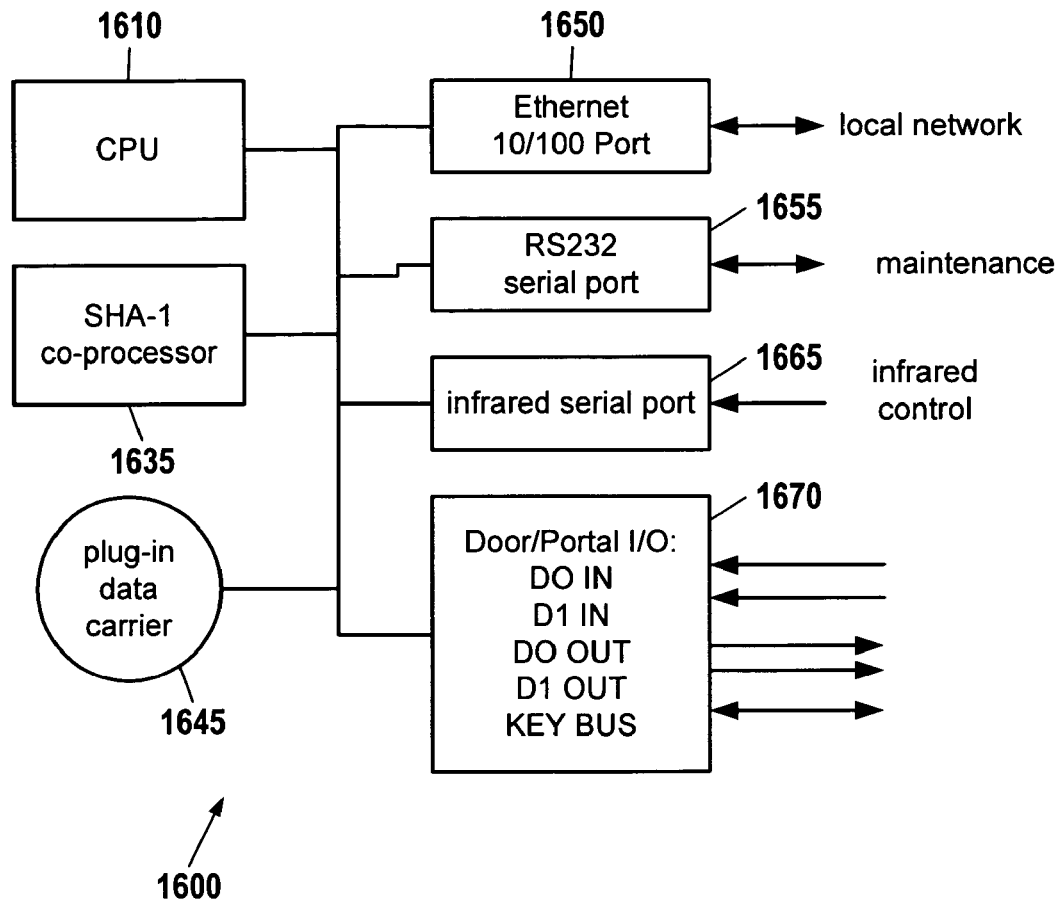
FIG. 16 is a diagram illustrating one embodiment of an optional network-accessible expansion module included in certain embodiments of the upgrade apparatus of the present invention.

FIG. 16 is a diagram illustrating one embodiment of an optional network accessible expansion module 1600 included in certain embodiments of the upgrade apparatus of the present invention. The expansion module 1600 is a simple network-powered door interface that does not contain access rights to memory, real time clocks, or other features that make up a full secondary controller 210. Instead, these inexpensive modules 1600 rely on a fast local area network connection to a secondary control area 210, which serves as a master. In effect, these expansion modules 1600 are expansion devices that enable a single secondary controller 210 to control as many as 16 doors. The expansion module 1600 comprises a central processing unit 1610, a SHA-1 coprocessor 1635, a plug-in data carrier socket 1645 for use with a memory-only iButton®, an Ethernet 10/100 port 1650 for connecting to the internet, an RS 232 serial port 1655 for use in maintaining the expansion module 1600, an infrared serial port 1655, and a door-portal interface processor 1670.

Figure 17:
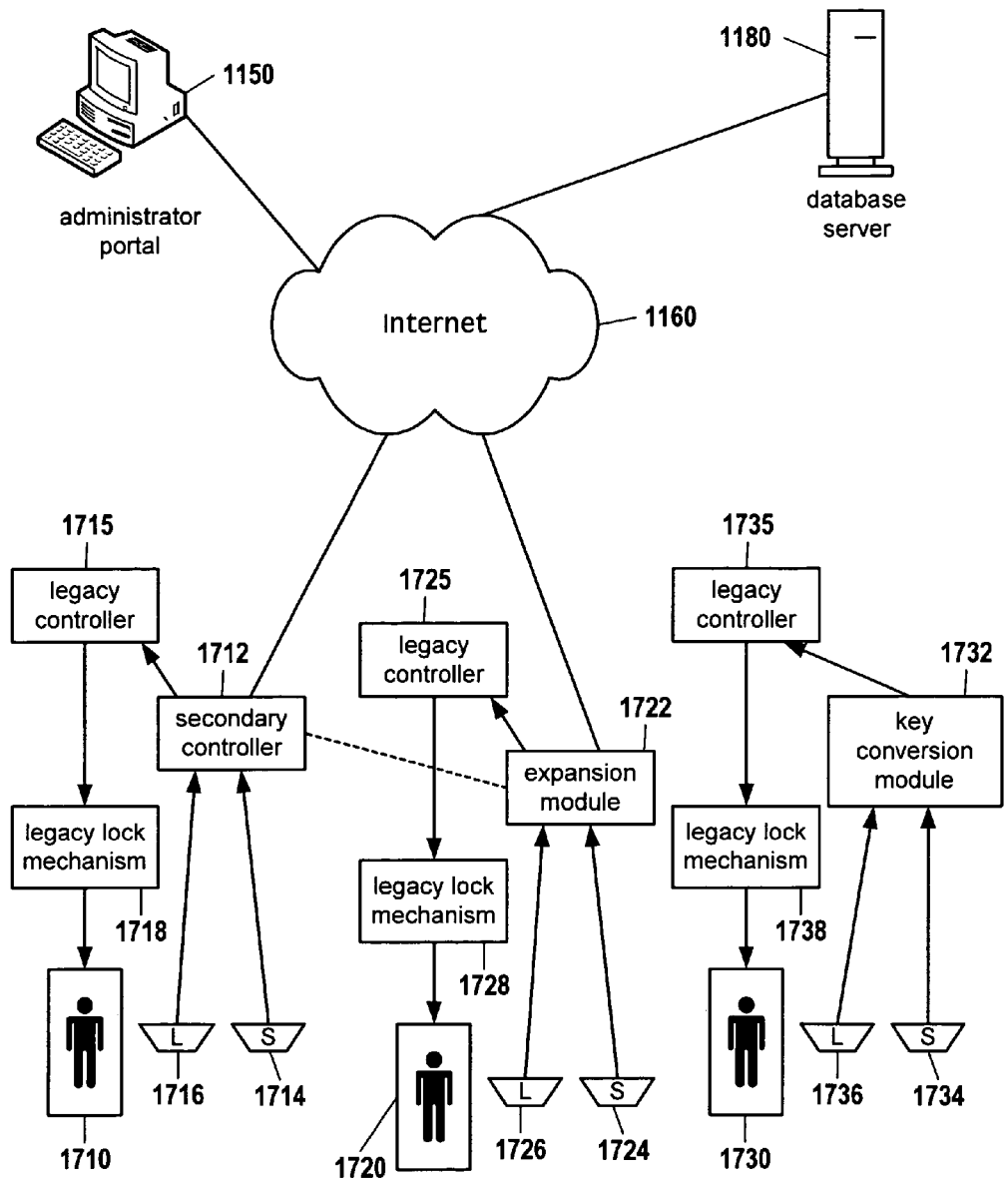
FIG. 17 is a block diagram illustrating an embodiment of the present invention for controlling access to portals retrofitted with the secondary controller of FIG. 2a, the expansion module of FIG. 16, and the key conversion module of FIG. 15.

FIG. 17 is a block diagram illustrating an embodiment of the present invention for controlling access to (1) a first portal 1710 retrofitted with a secondary controller 1712 and secondary token reader 1714, (2) a second portal 1720 equipped with an expansion module 1722 that facilitates access control by secondary controller 1712, (3) a third portal 1730 not retrofitted with a secondary controller, but instead equipped with a key conversion module 1732. In each case, the legacy controller 1715, 1725, or 1735 operates a corresponding legacy lock mechanism 1718, 1728, or 1738 to provide access to the corresponding portals 1710, 1720, and 1730. In each case, access to the portals 1710, 1720, and 1730 can be obtained by presenting a legacy token 170 to the corresponding legacy token reader 1716, 1726, and 1736 installed proximate to each of these portals. Access rights to the secondary security system are managed through an administrator portal 1150 that is in secure communication with a database server 1180, both of which are in secure communication with the secondary controller 1712.

Figure 18:
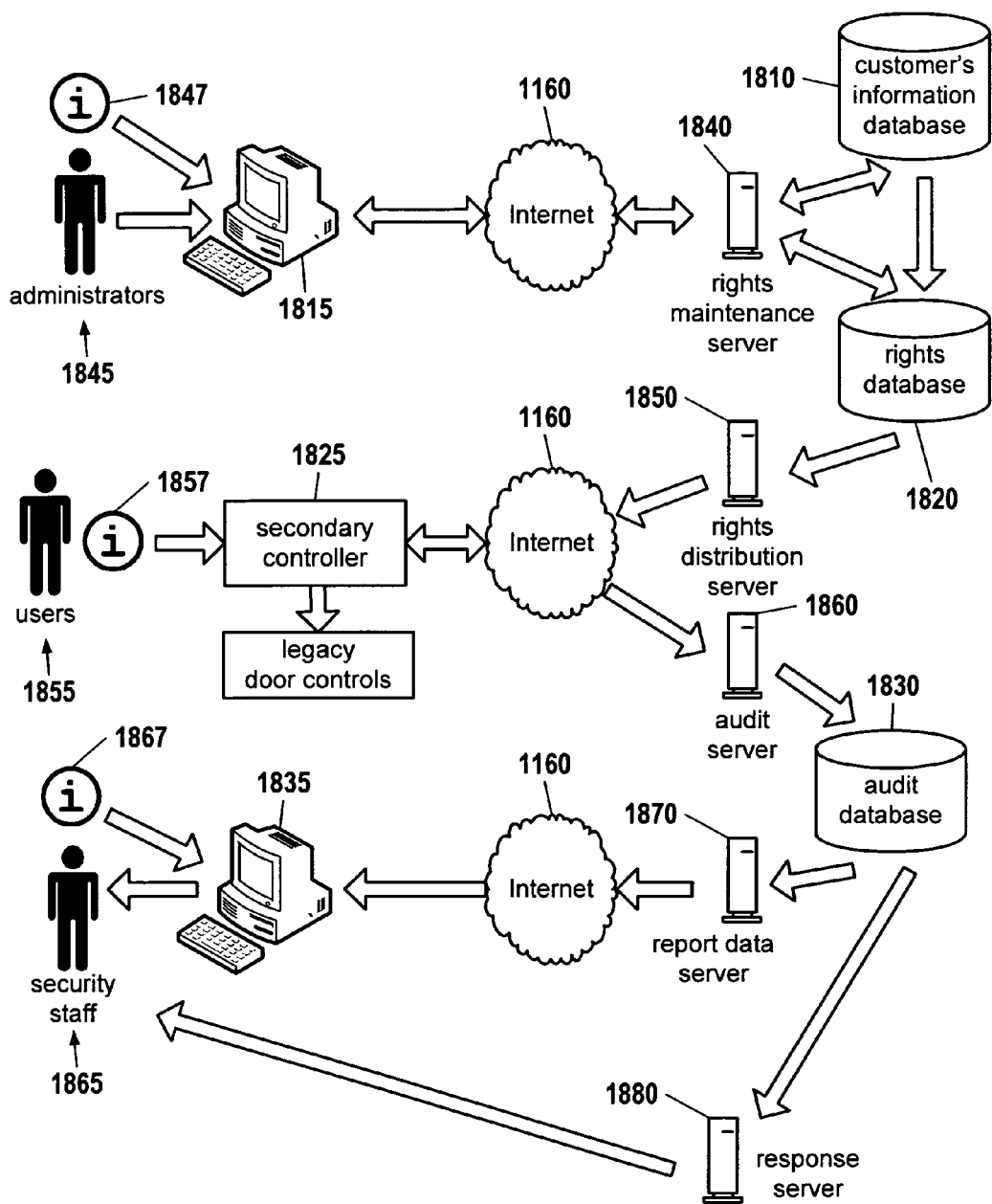
FIG. 18 is a block diagram illustrating one embodiment of a database and server configuration used to manage the secondary security system.

FIG. 18 is a block diagram illustrating one embodiment of a database and workstation configuration used to manage and monitor the secondary security system. The customer's information database 1810 holds all the non-access-rights-related information about people, keys, doors, and zones. The rights database 1820 holds the matrix of access rights (i.e., the secondary access rights list) for the keys or credentials of the secondary security system. The audit database 1830 is a repository for storing the audit data of the system, which can be used for various historical data analysis tools maintained by the security staff's workstation 1835.

FIG. 18 provides separate administrator and monitoring workstations 1815 and 1835. The administrator workstation 1815 runs a secure rights administration application. The monitoring workstation 1835 runs a secure data reporting application.

Authorized administrators 1845 who identify themselves with a proper iButton® credential 1847 and a PIN or a pass phrase can use the administrator workstation 1815 to make rights changes and add and delete keys and people to the secondary security system. The rights maintenance server 1840 mediates communications and access between the administrator workstation 1815 and the customer information and rights databases 1810 and 1820. After changes are made to the matrix of access rights held in the rights database 1820, the rights distribution server 1850 pushes those changes out to the corresponding secondary control panels 1825.

Users 1855 with iButton® credentials 1857 are given access to doors and portals based on the secondary access rights list maintained in the secondary control panels 1825. The secondary control panels 1825 send audit data (logs of activity and events) to the audit server 1860, which stores the audit data in the audit database 1830.

Authorized security staffpersons 1865 who identify themselves with a proper iButton® credential 1867 and a PIN or a pass phrase can use the monitoring workstation 1835 to run historical data analysis tools on the audit data maintained in the audit database 1830. The report data server 1870 gathers requested information from the audit database 1830 and delivers it to the reporting applications running on the monitoring workstation 1835. The audit database 1830 is also linked to a response server 1880 that catches specific items of interest in the audit database 1830 and issues calls, pages, and/or emails to appropriate security personnel.

Although not shown in FIG. 18, it is contemplated that a master database and a master database server 1190 (FIG. 11), possibly administered by a regional emergency response authority, may also be provided. Personnel at the regional emergency response authority could transmit situation mode information (e.g., a disaster response mode as illustrated in FIG. 14) to different customers' rights distribution servers 1850 throughout the region. In this manner, the present invention can facilitate coordinated access control responses to regional emergencies.

Although the foregoing specific details describe various embodiments of the invention, persons reasonably skilled in the art will recognize that various changes may be made in the details of the apparatus of this invention without departing from the spirit and scope of the invention as defined in the appended claims. For example, in some embodiments, the secondary controller can be configured, for greater security, to process inputs from a PIN pad and/or biometric scanner in addition to the secondary token reader. Therefore, it should be understood that, unless otherwise specified, this invention is not to be limited to the specific details shown and described herein.

I claim:

1. An apparatus for extending the functionality of a legacy security system that controls access to at least one portal, wherein:

said legacy security system comprises a plurality of legacy tokens, a legacy token reader and a legacy control panel, each legacy token carries a legacy-system access key, said legacy token reader and said legacy control panel are communicatively coupled together over first and second data channels, said legacy token reader has first and second data channel outputs for connecting to said first and second data channels, said legacy control panel has first and second data channel inputs for connecting to said first and second data channels, and said legacy control panel is programmed to grant access to the portal in response to reading a serial data stream that carries an authorized legacy-system access key, said apparatus comprising:

a secondary token reader operable to communicate with secondary tokens containing secondary-system access keys;

a secondary control panel in communication with said secondary token reader, said secondary control panel having a legacy-reader interface, a legacy-controller interface, a memory, and a rights-management interface wherein the legacy-reader interface is adapted for electrical connection to the first and second data channel outputs of the legacy token reader to enable communication with said legacy token reader, the legacy-controller interface is adapted for electrical connection to the first and second data channel inputs of the legacy control panel to enable communication with said legacy control panel, the memory is adapted to store an access rights list of secondary-system access keys associated with access rights to the portal, the rights-management interface is adapted to accept programming input to update and manage said access rights list, and the secondary control panel has an operational mode adapted to (a) transmit a memorized authorized legacy-system access key in response to an evaluation, using said access rights list, that a secondary-system access key received from a secondary token is associated with rights to access the portal, and (b) transmit any legacy-system access keys received from a legacy token to the legacy control panel without evaluation against said access rights list.

2. The apparatus of claim 1, wherein the secondary control panel has a learning mode for memorizing a legacy-system access key received from the legacy token reader.

3. The apparatus of claim 1, wherein said first and second data channels are dedicated to the communication of binary zeros and ones, respectively, of a common serial data stream.

4. The apparatus of claim 3, wherein the legacy-system access key is no more than 24 bits in length, and wherein the secondary-system access key comprises at least a 64-bit unique identifier.

5. The apparatus of claim 1, wherein the secondary-system tokens are operable to receive a challenge message from the secondary token reader and generate a message authentication code using a secure hash algorithm that uses the challenge message as an input.

6. The apparatus of claim 1, wherein the secondary token reader is adapted to mediate communications from the legacy token reader to the secondary control panel.

7. The apparatus of claim 1, wherein the secondary control panel also has supervised ajar, tamper, and request-to-exit inputs, and hosts a plurality of fully isolated high current solid state strike and auxiliary drivers, whereby to enable the secondary controller to function as a fully self-sufficient door controller.

8. A method of using a legacy control panel and a secondary control panel to regulate access to a doorway, the method comprising:
  receiving an access credential from a token reader communicatively coupled to the secondary control panel;
  using the secondary control panel to evaluate the access credential against an access rights list that is associated with the secondary control panel;
  transmitting a memorized legacy access credential from the secondary control panel to the legacy control panel; and
  using the legacy control panel to engage or disengage a lock mechanism to enable passage through the doorway.

9. The method of claim 8, further comprising:
  configuring the secondary control panel to memorize a legacy access credential; and
  causing the secondary control panel to memorize a legacy access credential to subsequently transmit to the legacy control panel when subsequent attempts are made to access the doorway.

10. The method of claim 8, wherein:
  the access rights list associated with the secondary control panel is not recognized or processed by the legacy control panel;
  the legacy control panel is associated with a legacy access rights list by which it recognizes the memorized legacy access credential; and
  the legacy access rights list is distinct and independently administered from the access rights list associated with the secondary control panel.

11. The method of claim 10, wherein the access credential received from the token reader is a cryptographically secure access credential, but where the memorized legacy access credential is not cryptographically secure.

12. The method of claim 10, further comprising:
  providing both a legacy token reader and a secondary token reader to provide access to the doorway, thereby enabling bearers of both legacy tokens and secondary tokens to access the doorway;
  communicatively coupling both the legacy token reader and the secondary token reader to the secondary control panel; and
  configuring the secondary control panel to receive a legacy access credential from the legacy token reader and re-transmit the legacy access credential, without functionally consequential alteration, to the legacy control panel, while continuing to evaluate access credentials received from the secondary token reader against the access rights list associated with the secondary control panel.

13. The method of claim 12, further comprising:
  using an administrative system associated with the legacy control panel to create a legacy token having a legacy access credential;
  assigning access rights to the legacy access credential and manifesting said access rights in the legacy access rights list;
  configuring the secondary control panel to memorize the legacy access credential;
  producing the legacy token to the legacy token reader;
  transmitting the legacy access credential from the legacy token to the legacy token reader to the secondary control panel;
  causing the secondary control panel to memorize the legacy access credential, whereby the secondary control panel is operable to subsequently transmit the legacy access credential to the legacy control panel when subsequent attempts are made to access the doorway using secondary tokens.

14. The method of claim 13, further comprising:
  providing an administrator workstation to make rights changes and add and delete authorized credentials to a rights database;
  providing a rights distribution server in communication with the secondary control panel to push updated access rights lists from the rights database to the secondary control panel;
  providing an audit server and audit database to receive audit information tracking access attempts from the secondary control panel;
  providing a monitoring workstation equipped with historical data analysis tools to evaluate the audit data maintained in the audit database; and
  providing a report data server to receive audit data retrieval requests from the monitoring workstation and retrieve audit data from the audit database.

15. A method of upgrading a legacy security system having a legacy token reader with data-zero-bit and data-one-bit outputs, a legacy control panel with data-zero-bit and data-one-bit inputs, and data-zero-bit and data-one-bit wires connecting the legacy token reader's data-zero-bit and data-one-bit outputs to the legacy control panel's data-zero-bit and data-one-bit inputs, the method comprising:
  installing a secondary control panel in proximity with the legacy control panel, wherein the secondary control panel has a data-zero-bit input, a data-one-bit input, a data-zero-bit output, a data-one-bit output;
  disconnecting the data-zero-bit and data-one-bit wires from the legacy control panel's data-zero-bit and data-one-bit inputs;
  connecting the data-zero-bit and data-one-bit wires to the secondary control panel's data-zero-bit and data-one-bit inputs;
  running new wires from the secondary control panel's data-zero-bit and data-one-bit outputs to the legacy control panel's data-zero-bit and data-one-bit inputs;
  installing a secondary token reader in proximity with the legacy token reader;
  providing a communicative coupling between the secondary token reader and the secondary control panel; and
  maintaining a communicative coupling between the legacy token reader and the secondary control panel.

16. The method of claim 15, wherein the secondary control panel has a key bus input for interfacing with the secondary token reader, and wherein the method of providing a communicative coupling between the secondary token reader and the secondary control panel comprises running a key bus wire, distinct from the data-zero-bit and data-one-bit wires, between the secondary token reader and the secondary control panel.

17. The method of claim 15, wherein the secondary token reader has a data-zero-bit input, a data-one-bit input, a data-zero-bit output, a data-one-bit output, the method further comprising:
- disconnecting the data-zero-bit and data-one-bit wires from the legacy token reader's data-zero-bit and data-one-bit outputs;
- connecting the data-zero-bit and data-one-bit wires to the secondary token reader's data-zero-bit and data-one-bit outputs; and
- running new wires from the legacy token reader's data-zero-bit and data-one-bit outputs to the secondary token reader's data-zero-bit and data-one-bit inputs, whereby the secondary token reader mediates communications from the legacy token reader to the secondary control panel.

18. The method of claim 15, wherein the legacy token reader is installed in a public-access area, further comprising co-locating the secondary control panel with the legacy control panel in a secure area remote from the legacy token reader.

19. The method of claim 15, wherein the legacy security system includes both first and second legacy control panels communicatively coupled to first and second legacy token readers, respectively, the method further comprising:
- interfacing the secondary control panel with the first legacy control panel, but not with the second legacy control panel; and
- installing a key conversion module proximate the second legacy token reader, the key conversion module being operable to receive a secondary credential from a secondary token, extract a legacy credential from the secondary credential, and transmit the extracted legacy credential to the second legacy controller.

20. The method of claim 15, further comprising:
- connecting the secondary control panel to a public communications network;
- providing an administrator workstation to make rights changes and add and delete authorized credentials to a rights database;
- providing a rights distribution server in communication with the secondary control panel to push updated access rights lists from the rights database to the secondary control panel;
- providing an audit server and audit database to receive audit information tracking access attempts from the secondary control panel;
- providing a monitoring workstation equipped with historical data analysis tools to evaluate the audit data maintained in the audit database; and
- providing a report data server to receive audit data retrieval requests from the monitoring workstation and retrieve audit data from the audit database.

* * * * *